(No Model.)
J. H. JENCKS.
CUTTING PLIERS.
No. 298,588. Patented May 13, 1884.
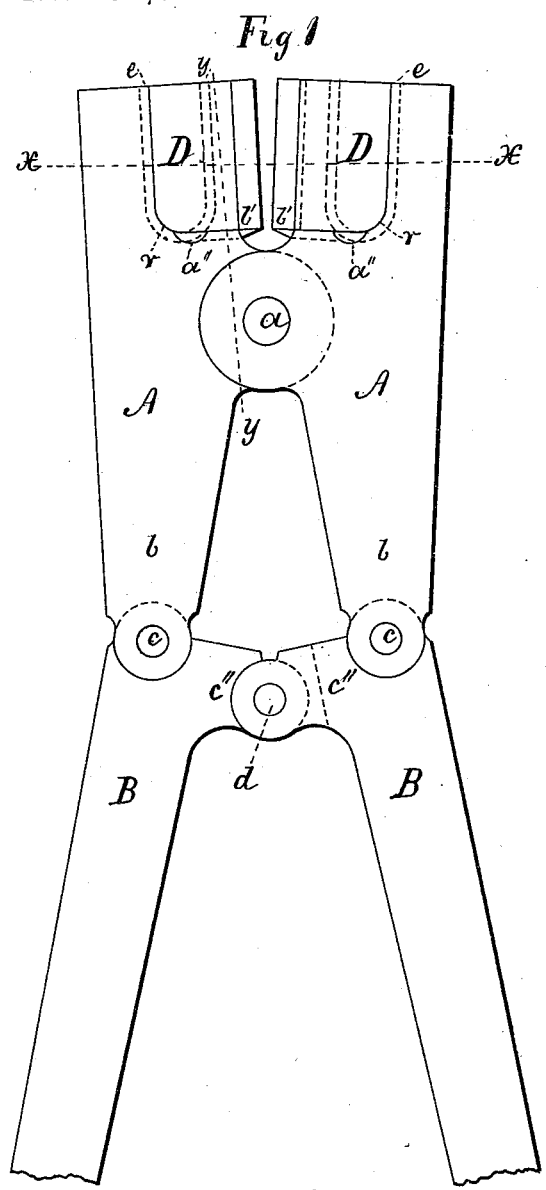
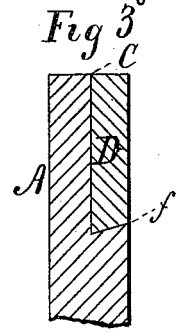
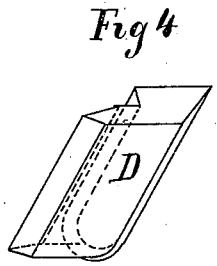
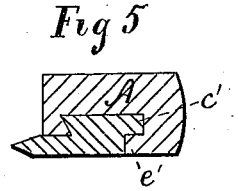
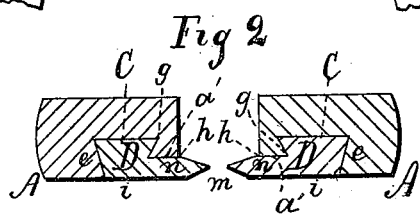
WITNESSES:
Rudolf Kjellman
Pat. F. Macshane
INVENTOR
John H. Jencks
BY James A. Whitney,
ATTORNEY
N. PETERS. Photo-Lithographer, Washington, D. C.

UNITED STATES PATENT OFFICE.

JOHN H. JENCKS, OF WATERBURY, CONNECTICUT.

CUTTING-PLIERS.

SPECIFICATION forming part of Letters Patent No. 298,588, dated May 13, 1884.

Application filed October 15, 1883. (No model.)

*To all whom it may concern:*

Be it known that I, JOHN H. JENCKS, of Waterbury, in the county of New Haven and State of Connecticut, have invented an Improvement in Cutting-Pliers, of which the following is a specification.

This invention relates to that class of cutting-pliers in which the cutting-edges are arranged to work in a plane substantially that of one of the sides of the implement.

The object of the invention is to provide an implement of this class in which the edge or cutting portions of the jaws shall be capable of ready removal, when desired, and yet be equally as firm and secure in position for use as if they were formed in one piece with the other portions of the jaws.

My invention comprises certain novel combinations of parts, whereby this object is effectually secured.

Figure 1 is a side view of the implement embracing my said invention. Fig. 2 is a transverse sectional view taken in the line $x\ x$ of Fig. 1. Fig. 3 is a longitudinal sectional view taken in the line $y\ y$ of Fig. 1. Fig. 4 is a detailed perspective view showing one of the parts included in the said implement. Fig. 5 is a transverse sectional view corresponding to a portion of Fig. 2, and illustrating a modification in one part of said implement.

A A are the jaws, pivoted together at $a$. The lower ends, $b\ b$, of these jaws may be extended to form the handles of the implement, or, when desired, may be connected by pivots $c$ to elbow-levers B, the short arm $c''$ of which is connected by a pivot, $d$, to constitute a toggle-joint, the levers B B in this case operating as handles of the implement. The two jaws A A are each chambered at one side, as illustrated more fully in Figs. 2 and 3. These chambers (indicated by the reference-letter C) are dovetailed or beveled inward at their backs $e$, as more fully shown in Fig. 2, at their inner ends, $f$, as more fully shown in Fig. 3, and at their outer sides, as more fully shown at $g$ in Fig. 2. The said outer sides of the chambers C, in other words, at the inner sides of the jaws A the latter are cut away, as shown at $h$, leaving a flat surface, against which rests one of the flat surfaces of the edges or cutting portions, just hereinafter described. It will be observed that each of the said chambers is open at the outer end of the jaw, in order that the said edge or cutting portions (indicated by the reference-letter D) may be passed into the chamber lengthwise of the jaws. The edge or cutting portions D have their main portions $i$ of a size proportioned to that of the chambers. In other words, the edges, saving and excepting the uppermost ends, are beveled or dovetailed so as to fit into the dovetailed chambers of the jaws, with their edges $n$ projecting inward beyond the inner edges of the jaws, and coincident with each other, in proper position for cutting any suitable material placed between them, the thinner lateral portion $n$, upon which the edges $m$ are provided, resting against the flat surface $a'$ of the cut-away portion at the inner sides of the jaws, hereinbefore explained. When desired, the inner side, $e$, of the dovetailed chambers of the jaw, instead of being made with a simple inclined or dovetailed form, may be made in the form of a groove and tongue, $c'\ e'$, as shown in Fig. 5, the corresponding shape being given to the adjacent side of the edge or cutting portion D. When desired, the corner where the dovetailed end $f$ of each chamber intersects the dovetailed side $e$ of said chamber should be rounded, as indicated at $r$ in Fig. 1; but when preferred these corners may be squared. It will be observed that the dovetailed parts of the edge or cutting portions D, being thrust into the dovetailed chambers of the jaws A, are effectually secured therein at the same time that they may on occasion be readily removed. To facilitate their removal, small cavities $a''$ may be provided in the material of the jaws immediately behind the said edge or cutting portions D, as represented in Fig. 1. When pressure is brought to bear upon the edges $m$ of the edge or cutting portions D, the lateral thrust upon the said portions will cause the same to be more firmly embedded in their places within the jaws A, inasmuch as the dovetailed form at the outer side, $e$, at the chambers, and the corresponding form of the surface with the said edge or cutting portions D, insures this result, so that there is no liability of the displacement of the cutting portions D by actual use and operation of the instrument, however severe such use and operation may be. At the same time said portions D are readily removable when required for any purpose.

To a certain extent the parts herein described are valuable and effective even in case the dovetailed form at the inner end, $f$, of the chambers in the jaws A, and the corresponding form of the contiguous ends of the edge or cutting portion D is dispensed with, and the said parts made simply with square or plane surfaces; but in practice, there is an advantage in the dovetailed arrangement hereinbefore explained, inasmuch as it tends to prevent the inner corners, $b'$, of the portions D from any tendency to spring outward when severe strain is exerted upon the edges $m$ in the operation of the implement.

What I claim as my invention is—

1. In a cutting-pliers, the jaws A, having the longitudinal dovetailed chambers C, cut away at the inner edges of the jaws $a'$, in combination with the edge or cutting portions D, fitting into the said chambers, and there retained with their edges $m$ projected inwardly beyond the inner edges of the jaws, all substantially as and for the purpose herein set forth.

2. In a cutting-pliers, the combination of the jaws A, having chambers formed with the dovetailed sides $e\ g$, and dovetailed inner end, $f$, the jaw being cut away at $a'$, as shown, in combination with the edge or cutting portions D, having correspondingly-shaped parts fitting longitudinally into the said chambers and there retained, with the cutting-edges $n$ resting upon the surface of the cut-away portion $a'$, and projecting inward beyond the inner edges of the jaws, all substantially as and for the purpose herein set forth.

JOHN H. JENCKS.

Witnesses:
BENJ. F. DEVOE,
JAS. F. MACSHANE.